United States Patent [19]

Aspman

[11] 4,154,992

[45] May 15, 1979

[54] IGNITION KEY AND HEADLIGHT SWITCH ENGAGING DEVICE

[76] Inventor: Harry C. Aspman, 3839 McKinley Ave., Tacoma, Wash. 98404

[21] Appl. No.: 804,904

[22] Filed: Jun. 9, 1977

[51] Int. Cl.² ............................................. H01H 27/00
[52] U.S. Cl. ........................................ 200/44; 70/255; 200/61.62
[58] Field of Search ............... 200/44, 61.54, 334, 200/61.62; 307/10 BP; 70/254, 255, 429

[56] References Cited

U.S. PATENT DOCUMENTS

| | | | |
|---|---|---|---|
| 3,522,394 | 7/1970 | Bellrose | 200/44 |
| 3,666,959 | 5/1972 | Crews | 200/44 X |
| 3,943,313 | 3/1976 | Carboni | 200/61.62 |

Primary Examiner—Anthony V. Ciarlante
Attorney, Agent, or Firm—Howard I. Podell

[57] ABSTRACT

A headlight switch can engage an ignition switch to prevent the removal of the ignition key when the headlights are on, the headlight switch may be mounted in a downward slanting manner to engage the ignition key or the headlight switch can form a partial ring with a bottom narrow gap to hinder turning of the ignition key or grasp of the ignition key while the headlights are in the on position. Where the ignition switch is mounted on the steering column of the vehicle the partial ring headlight switch can be mounted thereon or where the headlight switch is on the dashboard a solenoid control catch and latch mechanism mounted in a partial ring can remind the operator that the headlight switch is pulled in the on position.

6 Claims, 10 Drawing Figures

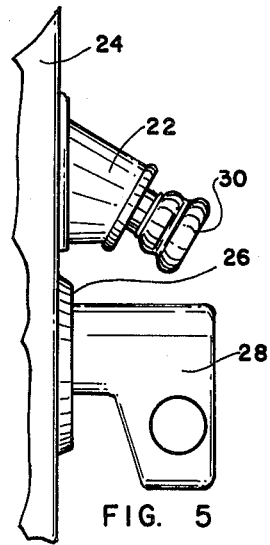
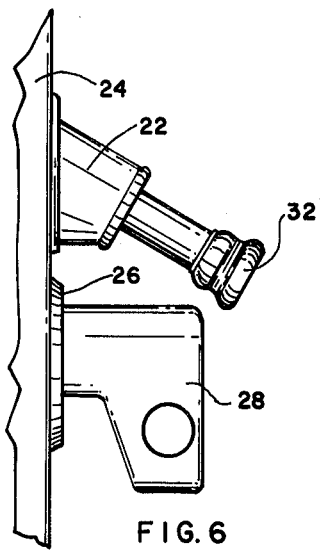
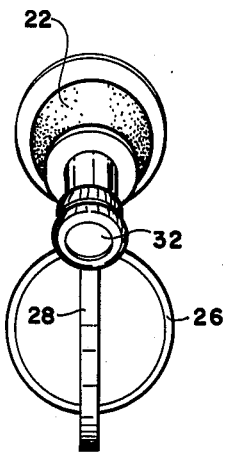
FIG. 5   FIG. 6   FIG. 7
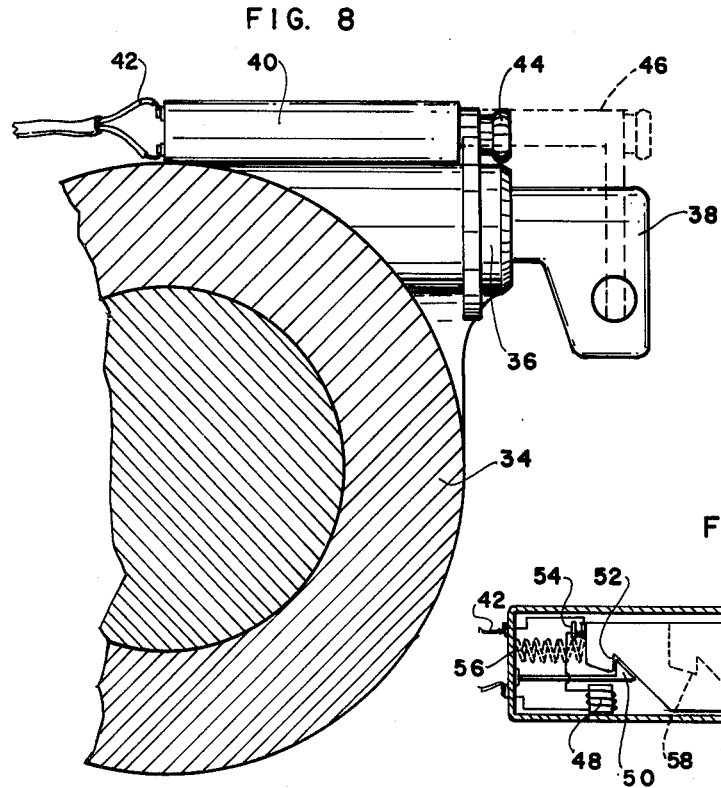
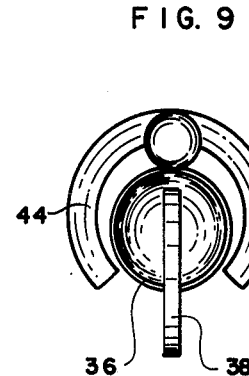
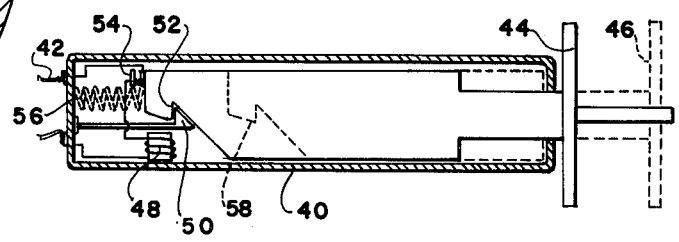
FIG. 8   FIG. 9   FIG. 10

IGNITION KEY AND HEADLIGHT SWITCH ENGAGING DEVICE

SUMMARY OF THE INVENTION

A headlight switch of an automobile which is shaped and located to engage the key of the ignition switch or to hinder the removal of the key of the ignition switch from the ignition switch when the headlight switch is in the ON position. The knob of the light switch may be fitted with a partial ring formed with a gap located to clear the ignition key in the ON position of the ignition key switch when the knob is in the ON position of the light switch, but which hinders rotation of the ignition key to the OFF position with the ON light switch position. The light switch knob may alternatively be mounted so as to extend in a slanting manner to engage the ignition switch in the ON position of the light switch. In an alternate form of the embodiment of solenoid may be fitted with a latch mechanism that is located to hinder or engage the ignition switch key in the ON position of the solenoid, with the solenoid electrically controlled by the headlight switch where the headlight switch is in a remote location from the ignition switch.

BRIEF DESCRIPTION OF THE DRAWINGS

FIG. 5 is a side view of an alternative embodiment of the light switch knob in the OFF position of the light switch;

FIG. 6 is a side view, similar to FIG. 5, but with the light switch knob in the ON position;

FIG. 7 is an elevation view of the switch of FIG. 6;

FIG. 8 is a side view of a further alternative embodiment of the invention;

FIG. 9 is a plan view of the invention of FIG. 8, and

FIG. 10 is a detail sectional view of the solenoid of the invention of FIG. 8.

Figure 1:
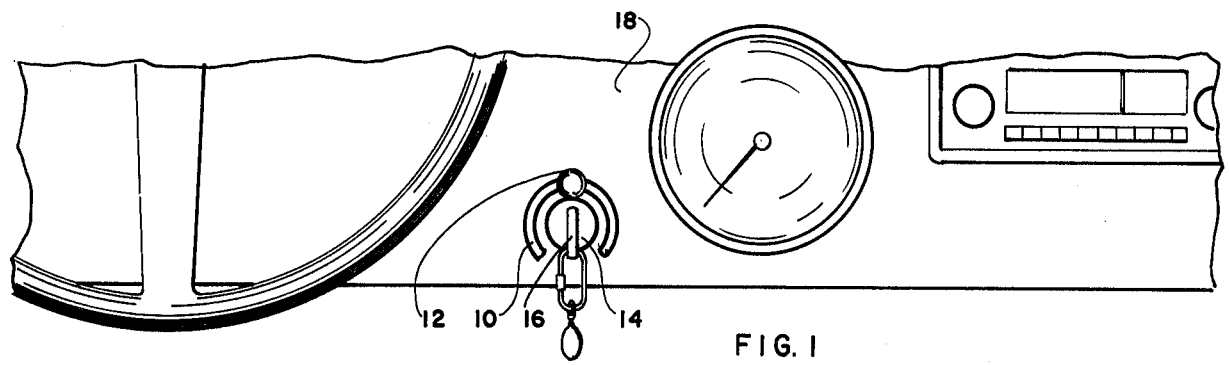
FIG. 1 is an elevation view of the dashboard of a vehicle.
Figure 2:
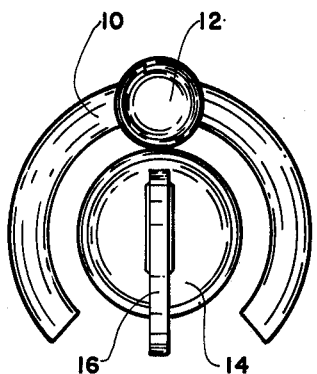
FIG. 2 is an elevation view of the light switch knob ring and the ignition switch and key, in the ON position of the ignition switch key.
Figure 3:
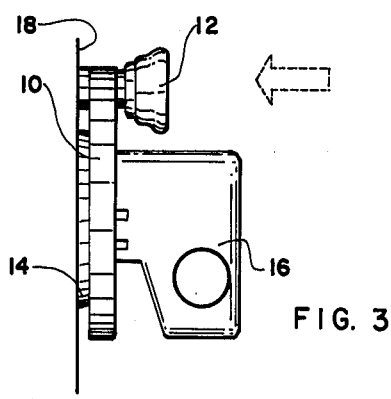
FIG. 3 is a side view of the switches of FIG. 2 in the OFF position of the light switch knob ring.
Figure 4:
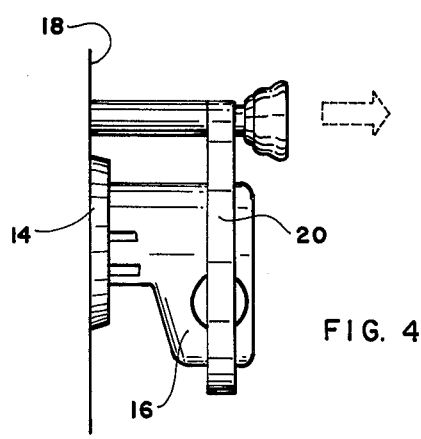
FIG. 4 is a side view of the switches of FIG. 3 in the ON position of the light switch knob ring.

With regard to FIGS. 1, 2, 3, and 4, a partial ring 10 has a bottom narrow gap and is mounted on an upper portion of the ring 10 to a dashboard light control knob 12. The partial ring 10 surrounds the ignition switch 14 in which the ignition key 16 is removably insertable. The ring in turn is seen to be mountable in the dashboard 18 so that when the partial ring 10 is pulled outward 20 surrounding the ignition key 16 the driver will have difficulty grasping the ignition key 16 without at the same time pushing the ring 10 inward towards the dashboard 18 thus shutting off the headlights of the vehicle to which the partial ring 10 is attached.

With regard to FIGS. 5, 6, and 7, another light switch 22 mounted in the dashboard 24 is positioned over another ignition switch 26 in which an ignition key 28 is seen. Pulling the downward slanted headlight knob 30 downward into the on position 32 prevents the easy removal of the key 28 from the ignition switch 26 until the headlight knob is returned to the off position 30.

With regard to FIGS. 8, 9, and 10, a steering column 34 of a third vehicle has ignition switch 36 mounted thereon wherein an ignition key 38 can be inserted. Atop the ignition switch 36 a headlight switch 40 is mounted and is connected 42 to the electrical circuitry for turning the headlights on and off. The partial ring and dashboard light control knob assembly 44 can be pulled forward to the on position 46 thus locking the ignition key 38 in place. A solenoid 48 mounted in the housing 40 may release a catch 50 to disengage the latch 52 permitting the electrical contact 54 to be broken and permitting the action of the spring 56 to drive the partial ring assembly 44 outward. Where this mechanism is mounted in the housing 40 the electrical wires 42 can be connected to a separate headlight switch and this partial ring 44 can be used as an extra safety device when the solenoid 48 is activated by the turning on of the other headlight switch, thus preventing the ignition switch from being removed while the headlight switch is in the on configuration. Such a housing 40 and partial ring 44 can be attached to existing steering column ignition switches 36.

The specific embodiments disclosed herein may find application in various instrument clusters as a reminder device. In the capacity of a reminder device, these embodiments should be very trouble free.

Having described a preferred embodiment of my invention, it is understood that various changes can be made without departing from the spirit of my invention, and, I desire to cover by the appended claims all such modifications as fall within the true spirit and scope of my invention.

1. In a vehicle, an ignition switch and headlight switch device, comprising:
    an ignition switch,
    an ignition key insertable into the ignition switch for operation of the ignition switch and
    a headlight switch, in which
    the headlight switch is fitted with means to interfere with manual operation of the ignition key of the ignition switch, in the ON position of the headlight switch, so as to remind an operator of the vehicle to turn off the said headlight switch when the key of the ignition switch is to be removed by the operator.

2. The combination as recited in claim 1 in which the ignition key is formed with a grip section that projects beyond the ignition switch in the installed position of the said key in the ignition switch, and
    the headlight switch is formed with a knob joined to a partial ring with the key mounted above and extending around the ignition switch so that the ring extends about the grip section of said key when the key is installed in said ignition switch,
    said headlight switch actuated by movement of the said knob and said ring section of the general axial direction of the key of the ignition switch in the installed position of said key.

3. The combination as recited in claim 2 in which the partial ring of the headlight switch is formed with a narrow bottom gap, with the ring located on the headlight switch so that the grip section of the key of the ignition switch fits in the said gap in the ON position of the headlight switch and the ON position of the ignition key.

4. The combination as recited in claim 1 wherein the headlight switch is mounted adjacent to the ignition switch, with the headlight switch actuated by an arm slidably mounted to said headlight switch and positioned so that said headlight switch is actuated to the ON position when said arm is manually slid in an axial direction away from the said headlight switch, and said headlight switch is actuated to the OFF position when said arm is manually slid in an axial direction towards the headlight switch, with said headlight switch mounted in relation to the ignition switch so that the axial direction of the said arm is along a line that slants from a side of the ignition switch to a position that intersects the longitudinal axis of the key of the ignition switch in the installed position of the said key, such that in the ON position of the headlight switch, the said arm extends beyond the free end of the ignition key in the installed position of said key and in the OFF position of the headlight switch, the said arm does not extend beyond the free end of the said key in the installed position of said key.

5. The device of claim 1, wherein the ignition switch is mounted on a steering column of a vehicle, a housing is mounted on the ignition switch, a partial ring having a bottom narrow gap is extendably mounted in the housing over the ignition switch, a latch is attached to a distal end of the partial ring, and electrical-responsive means are mounted in the housing for moving the latch in response to the actuation of the headlight switch, which headlight switch may be mounted on a dashboard of the vehicle so that in the ON position of the headlight switch, the partial ring extends about the key in the installed position of the key.

6. The device of claim 5, wherein the means of moving the latch comprises:
a catch releaseably engaging the latch mounted in the housing,
a solenoid mounted in the housing and connected to the catch to release the catch from engagement with the latch,
the solenoid electrically connected to the headlight switch and activated by the headlight switch, and
a spring mounted in the housing and compressably pressing against the latch, whereby the ring may be moved into a position to extend about the key.

* * * * *